United States Patent [19]
Lindsey

[11] Patent Number: 5,473,852
[45] Date of Patent: * Dec. 12, 1995

[54] MECHANICAL DEVICES AND STRUCTURES

[75] Inventor: Kevin Lindsey, Sunbury-on-Thames, England

[73] Assignee: British Technology Group Ltd., London, England

[*] Notice: The portion of the term of this patent subsequent to Oct. 10, 2006, has been disclaimed.

[21] Appl. No.: 118,256

[22] Filed: Sep. 9, 1993

Related U.S. Application Data

[63] Continuation of Ser. No. 1,240, Jan. 6, 1993, abandoned, which is a continuation of Ser. No. 689,840, filed as PCT/GB89/01511, Dec. 20, 1989, abandoned.

[30] Foreign Application Priority Data

Dec. 22, 1988 [GB] United Kingdom ............... 8829931

[51] Int. Cl.⁶ .................................. E04H 12/00
[52] U.S. Cl. .................. 52/648.1; 52/653.2; 52/655.2; 52/DIG. 10; 248/603
[58] Field of Search .................. 52/648.1, 645, 52/646, 652.1, 653.1, 653.2, 655.2, DIG. 10; 403/170, 171, 172, 176, 217; 248/603, 581, 522

[56] References Cited

U.S. PATENT DOCUMENTS

| | | | |
|---|---|---|---|
| 3,830,011 | 8/1974 | Ochrymowich | 52/DIG. 10 |
| 4,183,190 | 1/1980 | Bance | 52/648 |
| 4,438,615 | 3/1984 | Wendel | 52/648 |
| 4,591,286 | 5/1986 | Galan Inchaurbe | 403/171 |
| 4,637,193 | 1/1987 | Lange | 403/171 X |
| 4,667,451 | 5/1987 | Onoda | |
| 4,806,041 | 2/1989 | Chamayou Dit Felix | 403/171 |
| 4,872,291 | 10/1989 | Lindsey | |
| 4,905,443 | 3/1990 | Sutcliffe | 403/171 X |
| 4,907,907 | 3/1990 | Kreusel | 403/171 |
| 4,912,889 | 4/1990 | Palumbo | 52/648 X |

FOREIGN PATENT DOCUMENTS

| | | | |
|---|---|---|---|
| 210776 | 2/1987 | European Pat. Off. | |
| 256853 | 2/1988 | European Pat. Off. | |
| 2137257 | 12/1972 | France | |
| 2145065 | 2/1973 | France | |
| 1775125 | 5/1971 | Germany | |
| 2436628 | 4/1976 | Germany | 52/648 |
| 2088987 | 6/1982 | United Kingdom | |
| 2131847 | 6/1984 | United Kingdom | |
| 2194182 | 3/1988 | United Kingdom | |
| 2240605 | 8/1991 | United Kingdom | 403/171 |
| 8404770 | 12/1984 | WIPO | |

Primary Examiner—Carl D. Friedman
Assistant Examiner—Kien T. Nguyen
Attorney, Agent, or Firm—Cushman, Darby & Cushman

[57] ABSTRACT

A very stiff mounting structure comprises at least three pyramidally disposed rod-like members rigidly coupled together at one end and with their other ends rigidly coupled to a base either to stiffen the base and/or to mount a device such as a tool or instrument with respect to it. Three pyramidally disposed members (1a, 1b, 1c, FIG. 10) may be mounted on a tetrahedral base 22 or another three-dimensional base 22' (FIG. 11), or four such members on respective corners of a square pyramid, to form therewith a framework in which to mount, for example, a machine tool or measuring instrument, the base preferably being formed of similar rod-like members; or the base may be a plate or other structure of a separately existing machine or other entity.

21 Claims, 5 Drawing Sheets

MECHANICAL DEVICES AND STRUCTURES

This is a continuation of application Ser. No. 08/001,240, filed on Jan. 6, 1993, now abandoned, which was abandoned upon the filing hereof; which was a continuation of application Ser. No. 07/689,840 filed as PCT/GB89/01511 Dec. 20, 1989, now abandoned.

This invention relates to mechanical devices and structures.

In particular, it relates to structures having an affinity with those described in my British Patent No. 2,194,182.

Published British Patent 2194182 describes and claims a mounting device comprising six rod-like members the ends of which are rigidly coupled together to form a substantially tetrahedral structure. Three of the members which are not co-planar have fixedly coupled to them mounting means such as a machine tool, and the other three members comprise a triangular base and, having fixedly coupled to them means for locating a workpiece on which the machine tool is to work. The six members may all be of equal length, yielding a regular tetrahedral structure. Alternatively, the members can have the mounting means be of a different length from the remaining three members constituting the base. The published Application describes the advantageous physical and mechanical properties (stiffness, vibration response, and thermal response characteristics) which may be attained by the use of such a structure.

It has been found that the advantages of the above described structure may also be retained, virtually uncompromised, in a mounting structure which has a rigid base and a first set of rod-like members disposed pyramidally with one end of each rigidly coupled to corresponding ends of the others at a common vertex and the other end of each rigidly coupled to the base, even when the rod-like members of the first set are more than three In number and/or the base is not itself formed simply of a further set of three rod-like members.

According to the present invention, therefore, there is provided a mounting structure which comprises a rigid base and a first set of at least three rod-like members disposed pyramidally with one end of each rigidly coupled to corresponding ends of the others at a common vertex and the other end of each rigidly coupled to the base, wherein the base is other than simply a triangular structure formed of a further set of three rod-like members.

Such a mounting structure may also include mounting means comprising a rigid member fixedly coupled to the pyramidally-disposed rod-like members and in spaced relationship with the base.

The base of such a mounting structure according to the invention may be a more complicated three-dimensional triangulated structure, or may be, for example, a solid rigid metal plate or other structure to which the said other ends of the pyramidally disposed rod-like members are rigidly coupled at spaced-apart locations; and the plate or other structure may itself be an integral part of a separately existing machine or other article.

The rod-like members of the said first set may be three or four in number, and the base may have the form of a tetrahedron or a square pyramid, with the said other ends of the members of the first set secured to respective vertices of the base forming a triangle or a square respectively.

As contemplated in the published UK Patent already referred to, the coupling together of the said one ends of the rod-like members at their common vertex may be such that their pyramidal disposition is, in effect, that of a somewhat truncated pyramid.

The invention will be more fully explained and understood from the following description of embodiments thereof with reference to the accompanying drawings, in which.

Figure 11:
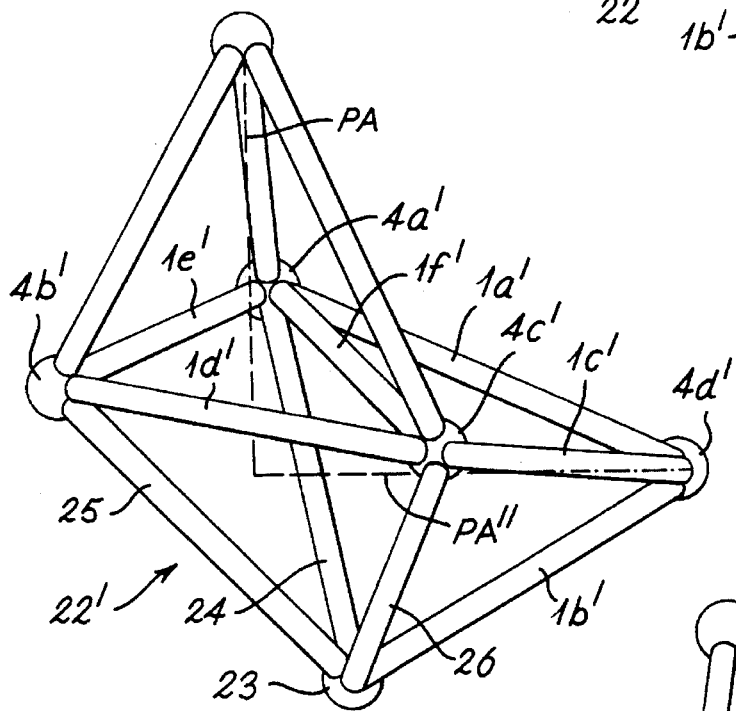
Figure 12:
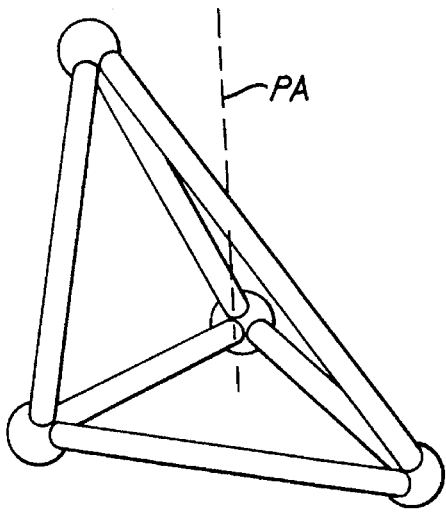
Figure 13:
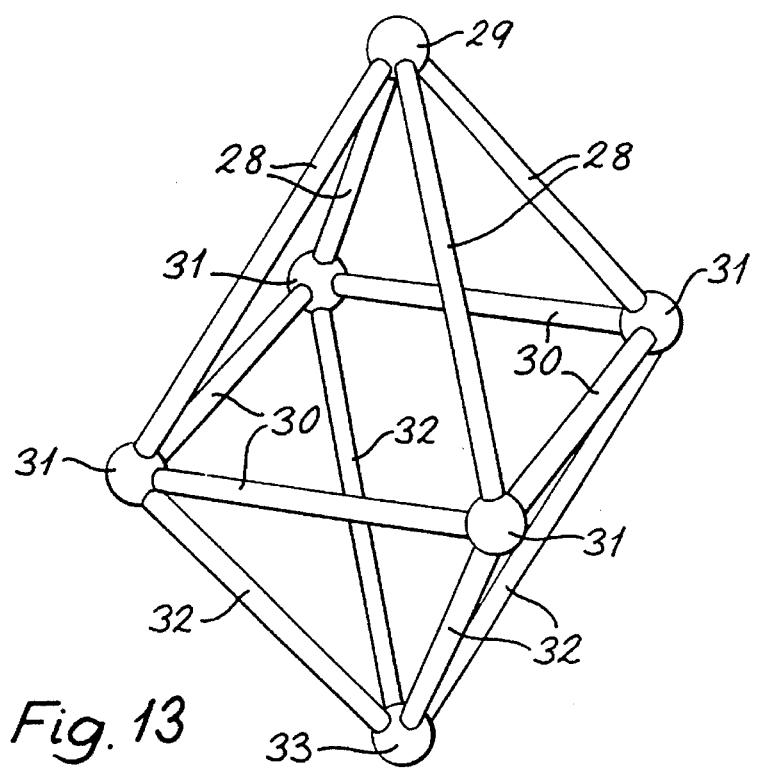
Figure 14:
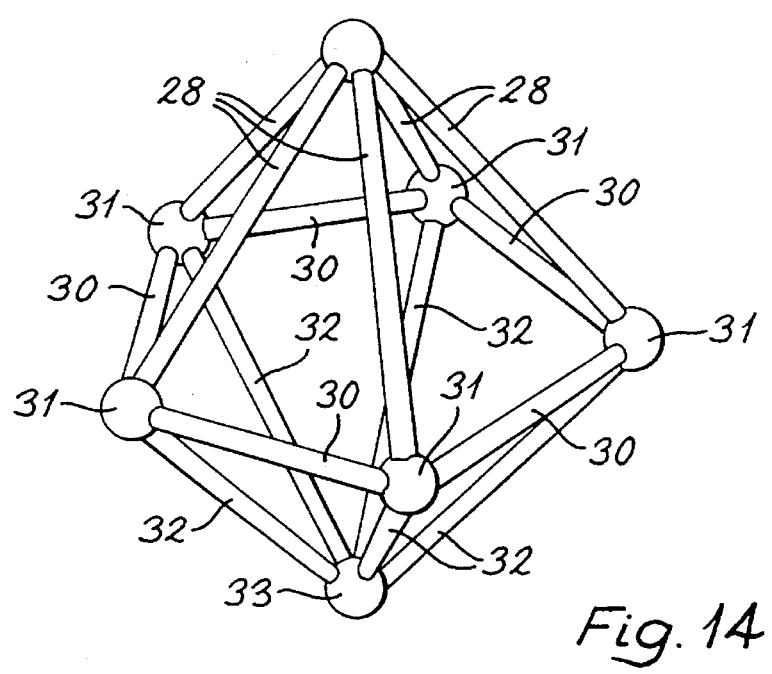

FIGS. 9, 10, 11 and 12 depict various practical constructions of the structures of FIGS. 5, 6, 7 and 8; and FIGS. 13 and 14 represent two further structures according to the invention.

Figure 1:
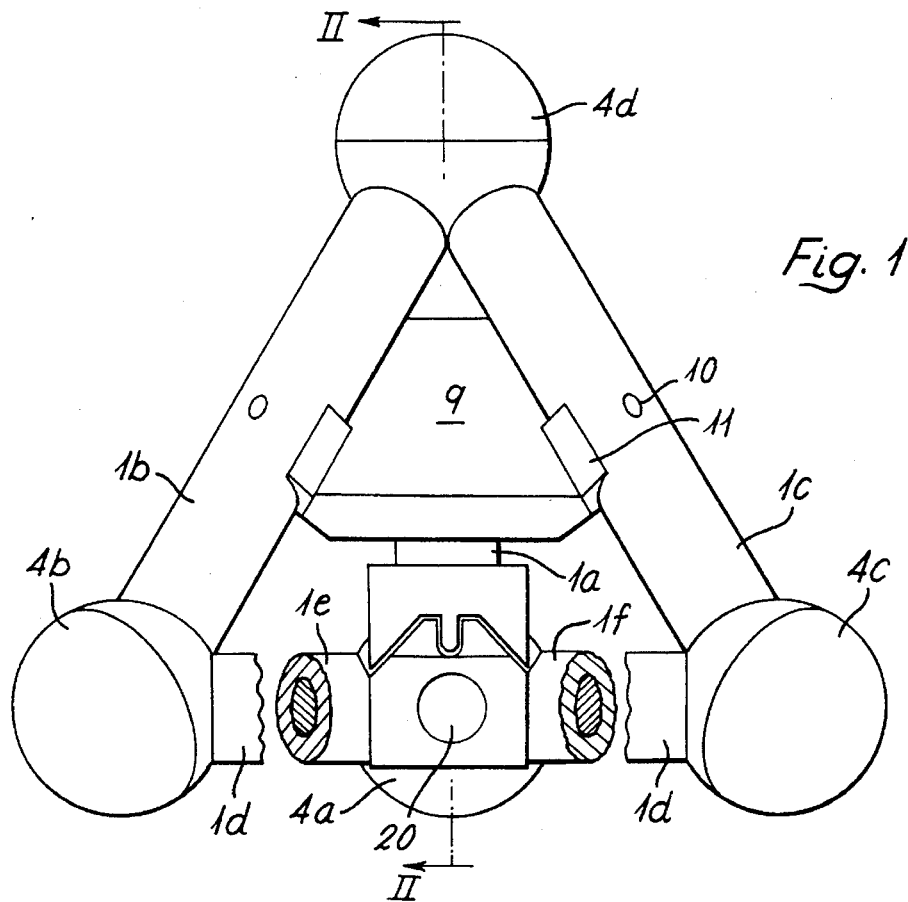
FIG. 1 is a front elevational view of a tetrahedral machine tool mounting device as described in U.K. Patent No. 2,194,182.
Figure 2:
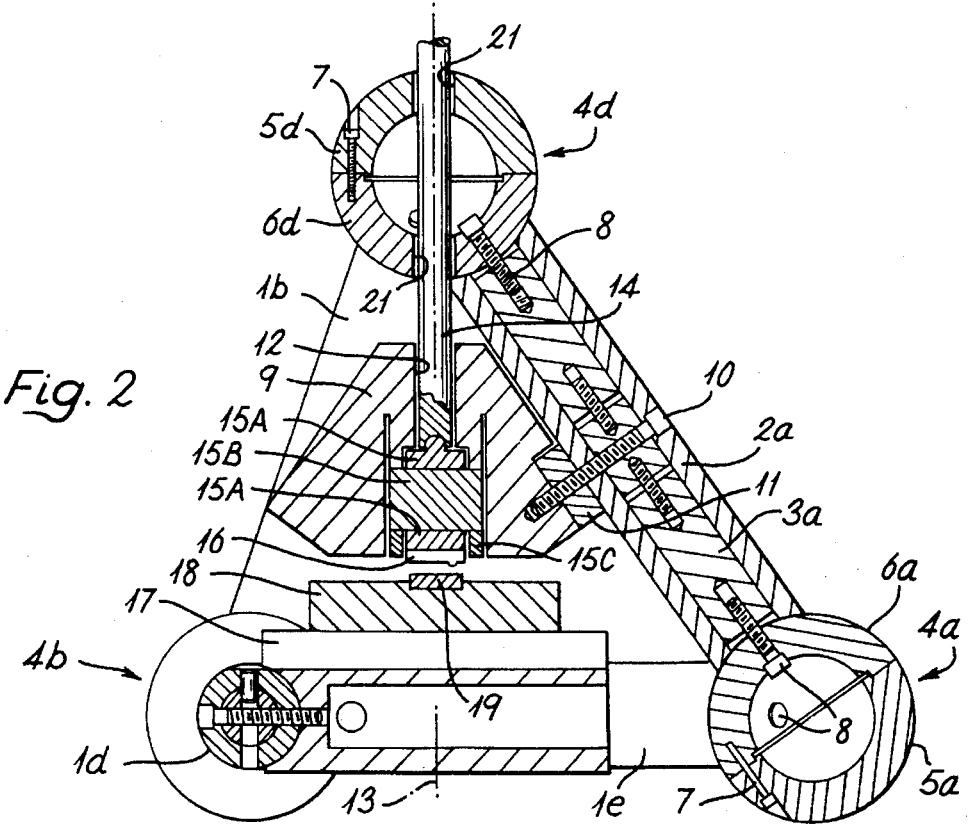
FIG. 2 is a lateral sectional view, taken along the line II—II in FIG. 1.
Figure 3:
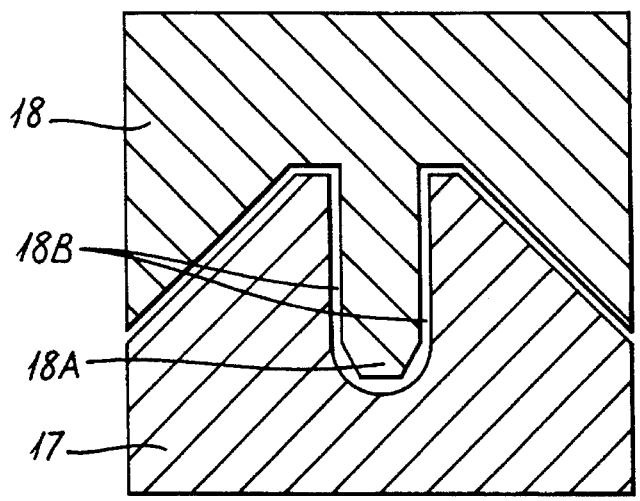
FIG. 3 is a section, on a larger scale, through a workpiece mounting table for the machine tool shown in FIG. 1 and 2.
Figure 4:
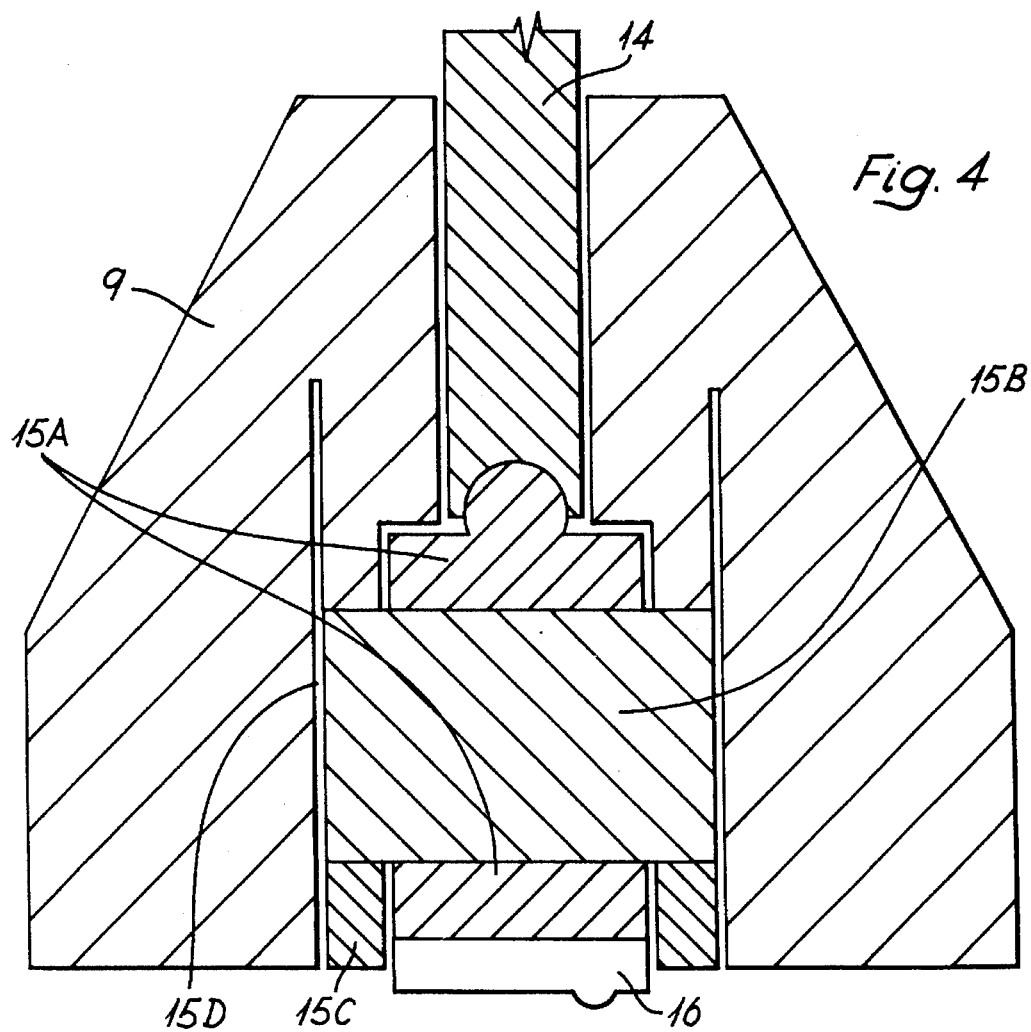
FIG. 4 is a section, on a larger scale, through the toolholder shown in FIGS. 1 and 2.

The tetrahedral mounting structure shown in FIGS. 1 and 2 includes six rod-like members $1a$–$1f$. Each member comprises a tubular outer strut $2a$–$2f$ enclosing a tensile rod $3a$–$3f$. At each apex of the tetrahedral structure is a hollow sphere $4a$–$4d$. Each sphere comprises a pair of mating hemispheres $5a$–$5d$, $6a$–$6d$. The halves of the hemispheres are held together by threaded bolts 7. Each sphere abuts the outer strut of three of the rod-like members and is clamped thereto by means of bolts 8 attached to the ends of the corresponding enclosed tensile rod. Mounted on the rod-like members $1a$, $1b$ and $1c$ which are remote from the base constituted by members $1d$, $1e$, and $1f$, is a machine tool holder 9. The machine tool holder is clamped to rod-like members $1a$, $1b$ and $1c$ by means of threaded bolts 10 and space blocks 11. The mounting interface is preferably replicated, as described and claimed in our co-pending Application No. 07/689,849 which is now abandoned and having the same filing date as the present Application. The machine tool holder 9 and the hollow sphere $4d$ have respective bores 12 and 21, coaxial with the machine principal axis 13, through which passes a drive shaft 14 carrying an air bearing spindle having a rotor 15A and a stator 15B and a grinding tool 16, as shown in FIG. 2 and (on a larger scale) in FIG. 4. The stator has an extension 15C to provide an extended viscous damping workface 15D. Mounted on the base rod-like members $1d$, $1a$ and $1f$ is a vee slideway 17 bearing a workpiece holder 18 to impart linear motion to a workpiece 19 beneath the grinding tool 16. As shown in FIG. 3, the workpiece holder is provided with a dividing strip 18A. Interfaces 18B are provided with a viscous damping medium. The slideway has a hollowed-out portion 20 so that the wall thickness is similar to that of the other structural components.

On the areas between the dividing strip 18A of the sliding workpiece holder 18 and the matching slot in the vee slideway 17 and between the stator of the air bearing rotary spindle 15 and the bore of the machine tool holder 9, there is relative motion, the viscous drag of the damping medium being arranged to be insignificant for the rate of motion required. The geometry of the damping interface can be matched to the modes of the vibration expected or most needing attenuation, for instance the plane vertical damping interfaces between the driving strip of the sliding workpiece holder 18 and the matching slot in the vee slideway 17 will respond efficiently to horizontal mode vibrations from the drive to the sliding workpiece holder and the principal axis (vertical) vibrations; whereas the cylindrical damping interface between the stator of the air bearing rotary spindle 15 and the bore of the machine tool holder 9 will respond efficiently to torsional vibrations from the rotary spindle and to principal axis (vertical) vibrations.

This vibration damping principle using viscous means can also, as described in published British Patent No. 2,194,182, be applied to the rod-like members 1a–1f, which may contain viscous damping fluid; and the damping affect may be increased if damping interfaces are machined or built into or on the components, which can be done without compromising structural static stiffness, i.e. the damping is essentially in parallel, rather than series, with the structural loop so the net result of adding the viscous damping can only be an increase of structure dynamic stiffness.

It has been found that the thickness of the viscous damping layer (i.e. the gap between the solid surfaces thus comprising the damping interface) can be 50 micrometers or greater with the chosen damping fluids so that no tribological (fretting, pick up, wear) problems will arise with dimensional tolerances within normal engineering practice. Close proximity of the two surfaces, as on some existing machines, is not needed; again avoiding tribological problems, and the inconsistent vibration damping which frequently results from stick-slip when the two surfaces are In close proximity or intermittent contact.

Figure 5:
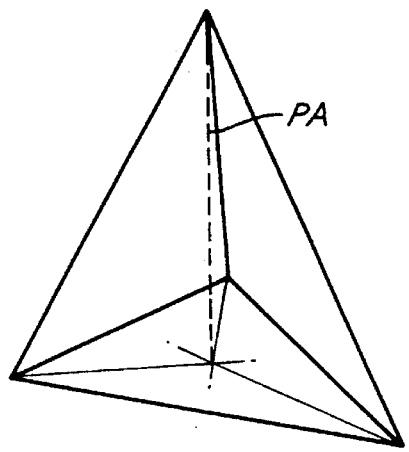
FIG. 5 represents the geometrical structure of the mounting device shown in FIGS. 1 and 2.
Figure 9:
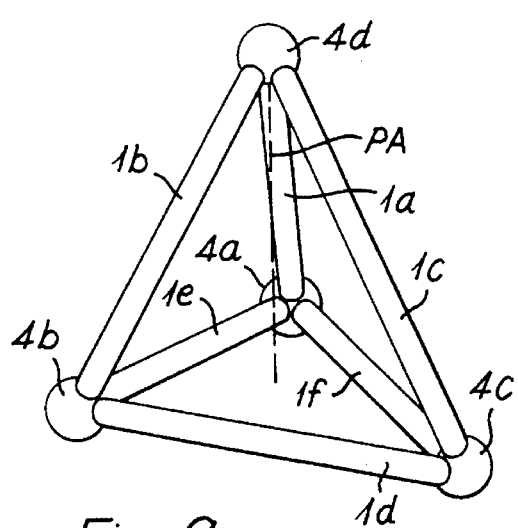

The geometrical form of the known mounting device shown in FIGS. 1 and 2 is represented diagrammatically in FIG. 5 as a regular tetrahedron whose edges represent the rod-like members 1a to 1f as shown In the corresponding FIG. 9 which is a simplified perspective view of the mounting structure shown in FIGS. 1 and 2. The machine principal axis 13 is represented in both FIGS. 5 and 9 by a broken line referenced PA.

In accordance with a first embodiment (not illustrated) of the present invention, the base of the structure, instead of being constituted by the three rod-like members 1d, 1e, and 1f and the spheres 4a, 4b and 4c by which they are joined, is a solid metal plate or other structure to which the lower ends of the members 1a, 1b and 1c are rigidly coupled at spaced-apart locations. Preferably, the mounting device is made from low aspect ratio components in order to maximize the fundamental frequency of the mounting device and thereby reduce vibration of the device. The plate or other structure may be free-standing, or may itself be an integral part of a separately existing article such as a machine on which, for example, ancillary equipment is mounted by means of the pyramidally disposed members 1a, 1b and 1c and mounting means secured (like the tool holder 9 shown FIGS. 1 and 2) to the members 1a, 1b and 1c in spaced relationship with the said plate or other structure.

Again, the pyramidally disposed members 1a, 1b and 1c, with their common spherical joint 4d, may be mounted on the plate or other structure not (or not solely) for the purpose of mounting ancillary equipment upon it but rather (or additionally) for imparting added stiffness or rigidity to the plate or structure.

Figure 6:
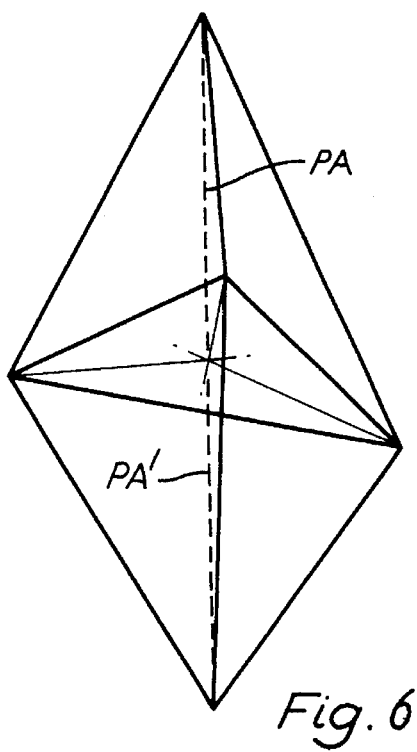
FIGS. 6, 7 and 8 represent geometrical structures according to the invention, with tetrahedral stiffening components.
Figure 10:
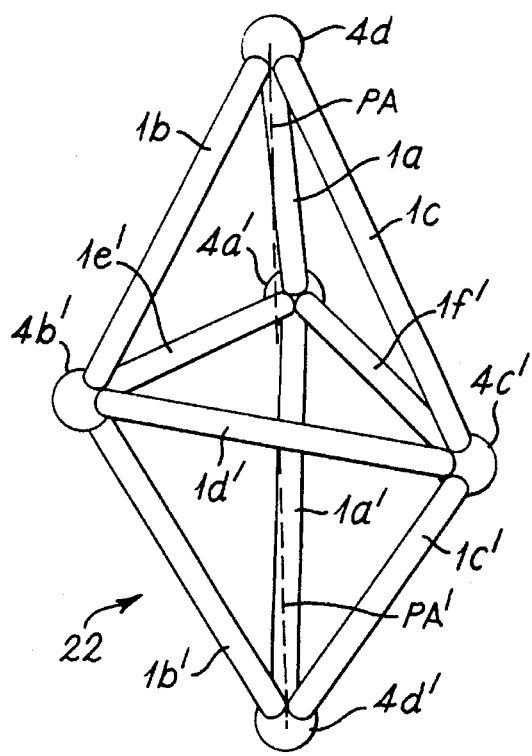

A further embodiment of a mounting structure in accordance with the invention is represented diagrammatically and in perspective outline In FIGS. 6 and 10 respectively, in which the pyramidally disposed members 1a, 1b and 1c are rigidly coupled to a base 22 which is itself in the form of an inverted regular tetrahedron and is constituted by co-planar rod-like members 1d', 1e', and 1f' coupled together by spherical joints 4a', 4b' and 4c', together with further rod-like members 1a', 1b' and 1c' coupled together at their lower ends by a spherical joint 4d' and each coupled at its upper end to a respective one of the joints 4a', 4b' and 4c. The base 22 is, in fact, a mirror image of the structure shown in FIG. 9, and the details of its construction may be identical with those shown in FIG. 2. Since all the rod-like members shown in FIG. 10 are of equal length, the base 22 provides a collinear extension PA' of the principal axis PA and increased working space within the structure in which mounting means (for instance, like the tool holder 9 and workpiece holder 17, 18 shown in FIGS. 1 and 2) may be secured in place on the members 1a, 1b and 1c or 1a', 1b' and 1c' or 1d', 1e' and 1f' for mounting tools and workpieces or co-operating components of other functional apparatus in a desired spaced relationship to one another along the extended principal axis. Axial symmetry, high resonant frequencies and other desired qualities remain uncompromised, as compared with the structure shown In FIGS. 1 and 2. Further lengthening of the extended principal axis can be provided, if required, by lengthening the members 1a, 1b and 1c and/or 1a', 1b', and 1c', within the limitation imposed by the need to maintain high resonant frequencies for these members.

Figure 7:
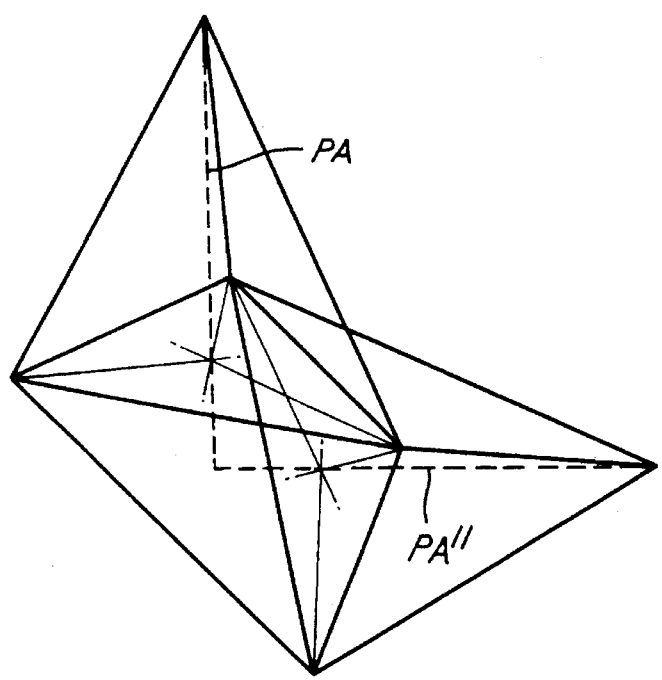

Structural symmetry may be almost entirely maintained, and other advantageous properties remain again largely uncompromised if, as in a further embodiment represented in FIGS. 7 and 11, a base 22' is provided which creates an auxiliary principal axis PA" intersecting the axis PA at an angle of 90° (as shown) or at some other selected angle. The base 22' comprises, to that end, the members 1d', 1e' and 1f' and spherical joints 4a', 4b' and 4c' as shown in FIG. 10, and also the members 1a', 1b' and 1c' having one end of each coupled together by spherical joint 4d'; but in this embodiment, although the members 1a' and 1c' are secured as before to the joints 4a' and 4c' respectively, they and the member 1b' are swung together through 90° about the line of member 1f' and the end of member 1b' which is remote from the joint 4d' is rigidly located by a further spherical joint 23 and further rod-like members 24, 25 and 26 (similarly constructed) which are secured between the joint 23 and, respectively, the joints 4a', 4b' and 4c'. This arrangement allows for mounting means to be secured in place, along the axis PA, on the members 1a, 1b and 1c and/or the members 1d', 1e' and 1f' and also, along the auxiliary axis PA", on the members 1a', 1b' and 1c' and/or the members 1f', 24 and 26. It will be seen that if the angle between the axes PA and PA" is to be 90° the member 25 will be of greater length than that of all the other rod-like members, and care therefore needed to keep its resonant frequency near or equal to that of those other members.

It will be seen that the base 22' comprises a non-regular first tetrahedron (having edges constituted by the members 24, 25 and 26 and vertices 4a', 4b' 4c' and 23 to three of which the members 1a, 1b and 1c are rigidly coupled) and, mounted over one of the lower triangular sides of this first tetrahedron, the pyramidal structure constituted by the members 1a', 1b' and 1c' and their common coupling joint 4d'.

Figure 8:
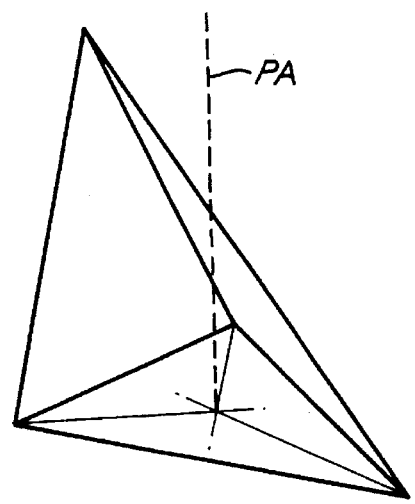

Other mounting structures In accordance with the invention may be designed for particular purposes; for example, each of the lower triangular sides of the tetrahedral base 22 shown FIG. 10 may have fitted over it a pyramidal structure like that constituted by the members 1a, 1b, 1c and 4d, and each of these will then enable mounting means to be fitted along respective ones of three auxiliary axes each intersecting the axis PA at an angle. Nor need those pyramidal structures be isosceles; if they are of unequal lengths, as represented in FIGS. 8 and 12, their common vertex may be offset, if that is required for some special purpose, from the principal axis PA as defined by the symmetrical case. In other embodiments of the invention, the set of pyramidally-disposed rod-like members having their mutually remote ends rigidly coupled to the base are more than three in number, for example four or five. The rod-like members are preferably, but not necessarily, of equal length and arranged in the form of a four-edged or five-edged pyramid. As in the above-described first embodiment, the base to which the mutually remote ends of those members are secured may be either a plate or panel which may be free-standing or a component part of a separately-existing item, or some other structure which may in this case be formed of a further set of four or five rod-like members coupled end-to-end to form a preferably planar four or five-sided polygon (with or without the addition of additional rod-like members to provide a fully triangulated structure). The further set of four or five rod-like members each has one end rigidly coupled at a common vertex to the corresponding ends of the others and having its other end (like the said other end of each of the said first set of rod-like members) rigidly coupled to a respective one of the corners of the four or five-sided polygon.

Such an embodiment is shown in FIG. 13 and is closely analogous to that represented in FIGS. 6 and 10. As can be seen in FIG. 13, the overall form is not of two tetrahedra back-to-back as in FIGS. 6 and 10, but of two square pyramids back-to-back, which comprises a first set of four rod-like members 28 disposed pyramidally with one end of each rigidly coupled to the corresponding end of each of the other three at a common vertex 29 and the other end of each rigidly coupled to a base in the form of a square pyramid comprising eight rod-like members. This is formed through four members 30 rigidly coupled end-to-end, to form a square at whose corners 31 respective ones of the first set are mounted, and four more members, 32, each having one end mounted at a respective one of the corners 31 and having their other ends coupled together at a vertex 33 in a pyramidal structure which mirrors that of the first set of members 28. Such a structure, strictly speaking, is not fully triangulated (unless it also comprises a further member secured as a diagonal of the square) but nevertheless is a very favorable structure, with a large available working space for mounting tools or the like within its bounds, and provides all the advantages of a fully triangulated structure, virtually uncomprised.

The further embodiment shown in FIG. 14 is closely analogous to those shown in FIGS. 10 and 13, but has five pyramidally arranged members 28 each having one end rigidly coupled to corresponding ends of the others at a common vertex 29, and each having its other end rigidly coupled to a respective corner 31 of a pentagon formed of five members 30 coupled end-to-end at the corners 31. Five further rod-like members, 32, arranged pyramidally and each having one end coupled to corresponding ends of the other four at a common vertex 33, have their respective other ends each rigidly coupled to a respective one of the pentagon corners 31.

It will be understood that it is not essential to employ mounting spheres for coupling together adjacent ends of the various rod-like members of a structure. A solid "hinge" comprising a weld contact or pin joint just sufficient to give static stiffness may be used instead.

The use of mounting structures according to the invention is not limited to machine tools. They may be used in any application, such as surface metrology where a high degree of stiffness and rigidity is required.

As mentioned earlier, a small degree of truncation of an apex formed where ends of rod-like members are coupled together is contemplated in some applications, for example, to facilitiate apical mounting of subsidiary structures.

Referring again to the (non-illustrated) first embodiment of the invention described above as including a base in the form of a plate, it will be understood that such an embodiment may be the result of adding a pyramidal structure of the kind represented by rod-like members 1a, 1b and 1c and their coupling joint 4d as shown in FIGS. 1 and 2, for example, as an additive feature to another entity/structure to provide positional accuracy, dynamic stiffness, etc. for it or for a critical component mounted on the pyramidal addition, for example to isolate such component environmentally (vibration, distortion due to thermal effects, etc.) relative to the other entity/structure whilst retaining its position relative thereto. Such an additive feature might be provided, for instance, for the critical mounting of a cutting tool, sensor, or measuring device on a structurally or environmentally flawed existing entity or structure, or as a cost-effective (that is, avoiding the need to discard the whole flawed entity/structure) improvement to an existent entity/structure. An example of such an additive fixture would be the addition of three hemispherical mounting interfaces to an existent entity/structure, each of the three hemispherical interfaces then having secured to it an end of one of the three rod-like members of the pyramidal additive fixture. Such a three-point mounting enables a tool or other device to be mounted with minimum self-stressing at the mounting. The mounting means in reality have to be extended to finite areas, but the minimum departure from perfect interfacing will result if these surfaces are spherical, preferably pin-jointed as in the spherical joints shown in FIGS. 1 and 2 in order to minimize self-stressing.

I claim:

1. A machine tool mounting device comprising:

at least three rigid rod-like members with one end of each being rigidly coupled to corresponding ends of others at a common vertex;

a machine tool holder secured to said rigid rod-like members and being constructed and arranged to be able to carry a machine tool; and a rigid base to which another end of each of said rod-like members is coupled, said rigid base comprising a three dimensional structure for rigidly carrying said rod-like members and the machine toolholder secured to said members.

2. A machine tool mounting device as claimed in claim 1, wherein said machine tool holder is disposed in spaced relation with respect to said base.

3. A machine tool mounting device as claimed in claim 1, wherein said rod-like members have substantially the same dimensions as one another.

4. A machine tool mounting device as claimed in claim 1, wherein the rod-like members are coupled to one another at said one end of each by a substantially spherical hollow member.

5. A machine tool mounting device as claimed in claim 4, wherein the hollow member comprises a pair of mating hemispheres.

6. A machine tool mounting device as claimed in claim 1, wherein said rod-like members are coupled to one another at said one end of each by a pin joint.

7. A machine tool mounting device as claimed in claim 1, wherein said rod-like members are coupled to one another at said one end of each by a welded contact.

8. A machine tool mounting device as claimed in claim 1, further comprising decoupling means provided between said rod-like members for inhibiting transmission of vibration.

9. A machine tool mounting device as claimed in claim 1, wherein said mounting device comprises low aspect ratio components for maximizing a fundamental frequency of said mounting device and for reducing the vibration of said mounting device.

10. A machine tool mounting device as claimed in claim 1, wherein said rod-like members each comprise a strut member and a tensile member.

11. A machine tool mounting device as claimed in claim 1, wherein at least one of said rod-like members comprise a tubular member having a tensile rod extending therethrough.

12. A machine tool mounting device as claimed in claim 11, further comprising a viscous damping material contained within said rod-like members.

13. A machine tool mounting structure as claimed in claim 1 wherein the rod-like members of the said pyramidal structure are three in number.

14. A machine tool mounting device as claimed in claim 1 wherein said three dimensional structure of said base is formed by a second set of rod-like members.

15. A machine tool mounting device as claimed in claim 14, wherein the base is of a tetrahedral form.

16. A machine tool mounting device as claimed in claim 14, wherein the base and said rod-like members of said pyramidal structure together form a double tetrahedron.

17. A machine tool mounting device as claimed in claim 14, wherein the base further comprises a rigid plate.

18. A machine tool mounting device as claimed in claim 14, wherein said rigid plate is formed from a metallic substance.

19. A machine tool mounting structure as claimed in claim 14, wherein the three dimensional structure of said base comprises a first tetrahedron, having a triangular side defined by three vertices to which said another end of each of the rod-like members of said pyramidal structure are respectively coupled.

20. A mounting structure as claimed in claim 14, wherein the base is in the form of a pyramid comprising eight rod-like members of which a first four are rigidly coupled end-to-end to form a square, the corners of which are coupled to respective ones of said another end of each of said rod-like members of said pyramidal structure, and a second four each having one end coupled to respective ones of said corners and another end coupled together at a common pyramidal vertex.

21. A machine tool mounting structure as claimed in claim 1 wherein the rod-like members of said pyramidal structure are four in number.

* * * * *